(12) United States Patent
Honeychurch et al.

(10) Patent No.: US 7,731,097 B2
(45) Date of Patent: Jun. 8, 2010

(54) LIQUID CONSERVATION DEVICE AND A LIQUID APPARATUS INCORPORATING THE LIQUID CONSERVATION DEVICE

(75) Inventors: Lindy Honeychurch, Rosevale (AU); Ashley Thompson, Doncaster East (AU)

(73) Assignee: Water Miser (Aust) Pty Ltd, Launceston, Tasmania (AU)

( * ) Notice: Subject to any disclaimer, the term of this patent is extended or adjusted under 35 U.S.C. 154(b) by 593 days.

(21) Appl. No.: 11/632,617

(22) PCT Filed: Jul. 15, 2005

(86) PCT No.: PCT/AU2005/001042

§ 371 (c)(1),
(2), (4) Date: Jan. 16, 2007

(87) PCT Pub. No.: WO2006/005138

PCT Pub. Date: Jan. 19, 2006

(65) Prior Publication Data

US 2008/0072971 A1    Mar. 27, 2008

(30) Foreign Application Priority Data

Jul. 15, 2004    (AU) .............................. 2004903888

(51) Int. Cl.
*G05D 23/13* (2006.01)
*G05D 23/02* (2006.01)
*F16K 49/00* (2006.01)
*F16K 17/38* (2006.01)

(52) U.S. Cl. ............... 236/12.19; 236/93 R; 137/337; 137/468

(58) Field of Classification Search ............... 236/93 R, 236/101 D, 20 R, 12.19; 137/468, 467, 337
See application file for complete search history.

(56) References Cited

U.S. PATENT DOCUMENTS 3,322,342 A * 5/1967 Veale ....................... 236/12.12
4,160,461 A    7/1979 Vataru et al.
5,181,656 A * 1/1993 Schwerdt .................... 237/8 C (Continued)

FOREIGN PATENT DOCUMENTS

AU    200126439 B2    9/2001

(Continued)

OTHER PUBLICATIONS

PCT/AU2004/000415, Apr. 2, 2003, Willsford et al.

*Primary Examiner*—Chen-Wen Jiang
(74) *Attorney, Agent, or Firm*—Barbara E. Johnson, Esq.

(57) ABSTRACT

A water saving device for us in a hot water system to recover an initial volume of cold water when a hot water tap is turned on. The device has an inlet for receiving water piped from a water heater, a primary outlet for delivering hot water to a tap, and a by-pass outlet through which any cooled water is diverted by a thermally actuated shuttle valve. The device also includes a secondary valve for closing off the by-pass outlet when the water pressure downstream of the primary outlet is high (such as when the down stream hot water delivery tap is closed and opening the by pass outlet when the water pressure downstream of the primary outlet is low, such as when the downstream hot water delivery tap is opened.

21 Claims, 10 Drawing Sheets

U.S. PATENT DOCUMENTS 7,487,923 B2 * 2/2009 Willsford et al. .......... 236/93 A

FOREIGN PATENT DOCUMENTS

| AU | 2004203253 A1 | 11/2004 |
| AU | 2005100401 A4 | 6/2005 |
| AU | 2005203025 B2 | 7/2005 |
| AU | 2005100624 A4 | 8/2005 |
| CA | 2162206 | 5/1997 |
| GB | 2 290 857 A | 10/1996 |
| WO | WO 2004/088051 A1 | 10/2004 |
| WO | WO 2007/019648 A1 | 2/2007 |

* cited by examiner

LIQUID CONSERVATION DEVICE AND A LIQUID APPARATUS INCORPORATING THE LIQUID CONSERVATION DEVICE

BACKGROUND OF THE INVENTION

1. Field of the Invention

This invention relates to a liquid conservation device. The invention also extends to a liquid conservation apparatus including the conservation device.

This invention relates particularly but not exclusively to a water conservation device for fitting to a domestic hot water tap so as to divert water that is below a specified design temperature away from the hot water tap. The water is only directed to and through the hot water tap once it reaches its design temperature. The initial volume of water that is diverted can then be recovered and re-used. It will be convenient to hereinafter describe this invention with reference to this example application.

However, it is to be clearly understood that the invention is capable of broader application. For example, the invention may be applied to a water system that provides cold water at a design temperature, eg cold water for drinking. In this case the device will be used to divert an initial volume of water that is above the design temperature away from a tap and then recycle it back to a cooling device so that it can be reused. Water will only be passed through the tap when it is at or below a set temperature.

Further the invention can be applied to drinks other than water including alcoholic beverages and also drinks like coffee and tea that should preferably be supplied within certain temperature ranges. The invention may also be applied to industrial liquids that need to be supplied in a certain condition.

The primary requirement for the invention to find application is that the substance must be a liquid and it must be desired for the liquid to be supplied in a certain condition. Generally this condition will mean supplying the liquid at a certain temperature. However, the Applicant does not exclude diverting an initial volume of liquid until other conditions have been reached, for example, a certain concentration of a component in the liquid, or a certain pH or salinity, or even a certain viscosity. Applicant envisages that the application of this invention could potentially be so wide that it is not possible at this time to provide a closed list of the possible uses of the invention.

2. Description of Related Art

In a domestic environment a hot water supply, eg a geyser, is typically situated spaced away from one or more hot water taps, while water in the geyser is kept at a design temperature, eg by one or more heating elements. Water that is held in the water lines in between use of the hot water supply is not heated and it cools slowly over a period of time. Typically, after half an hour or so it will be at the same temperature as the pipe and be around ambient temperature. As a result of this cooling of water in the pipe, when the hot water tap is turned on again the initial water flow from the tap is cold. Typically, a user might cause this water to flow directly to the drain and only commence use of the water passing out of the hot tap once it has warmed up sufficiently. This therefore leads to a loss of this water down a drain.

Clearly therefore, it would be advantageous if a way of saving the water could be devised. This is particularly so in recent times in Australia where water supplies have become more and more scarce. Water restrictions are in place in many regions and in addition several areas have been declared drought areas.

It would be particularly advantageous if a way could be devised of diverting this initial volume of cold water away from the tap so that it could be re-used either as hot or cold water. After the water had been warmed up to a required temperature it could be permitted to pass through the tap and used as hot water in the usual way.

SUMMARY OF THE INVENTION

According to one aspect of this invention there is provided a liquid conservation device comprising:

a housing defining a primary flow passage having a primary inlet at one end and a primary outlet at an opposed end, the housing also defining a secondary flow passage extending from a secondary inlet that opens into and communicates with the primary flow passage intermediate the primary inlet and primary outlet to a secondary outlet, the primary flow passage thereby comprising an upstream portion that is upstream of the secondary inlet of the secondary flow passage and a downstream portion that is downstream of the second inlet of the secondary flow passage;

a primary valve in said primary flow passage movable between a normal operating position in which it permits flow through the primary flow passage from the inlet to the primary outlet and a diverting position in which the valve means closes off the primary flow passage downstream of the secondary flow passage and directs liquid into the secondary flow passage, the primary valve including control means for positioning the valve means in the diverting position when predetermined criteria relating to a liquid being passed through the housing are not being met, and then moving the valve means to the normal operating position when the predetermined criteria relating to the liquid passing through the housing are being met, the control means also moving the valve means from the normal operating position back to the diverting position when the predetermined criteria are no longer being met;

a secondary valve for closing off the secondary flow passage, at least when the flow of liquid through the primary outlet out of the housing is stopped by means of a tap downstream of the primary outlet;

whereby when liquid is initially caused to flow through the device and the predetermined criteria in the liquid are not being met the primary valve is in the diverting position and will direct the liquid into the secondary flow passage and the secondary valve will be open to permit liquid to flow out of the secondary outlet, and when said predetermined criteria are being met the primary valve will move to the normal operating position closing off the secondary flow passage and directing liquid down the full length of the primary flow passage and out through the primary outlet, and when the flow of liquid out of the primary outlet of the housing is stopped the secondary valve will be in the closed position.

The liquid may be water and the predetermined criteria may be the temperature of the water passing through the housing. More specifically the predetermined criteria may be having a water temperature at or above a certain temperature.

The housing may define a shuttle chamber, and the primary valve may be a shuttle valve that can shuttle reversibly between said diverting and normal operating positions within said shuttle chamber.

Thus the secondary valve is in the closed position when there is no flow of liquid through the device due to a downstream tap being closed. This is to stop liquid supplied under pressure at the inlet to the device from flowing away down the secondary passage at this time if the shuttle valve is in the diverting position. However the secondary valve does not need to move to the closed position when the tap is switched off. It could move to the closed position when the shuttle valve moves to the normal operating position which is before the tap is switched off. It could also be moved to the closed position at the time when the tap is switched off. In summary the secondary valve needs to be in the closed position when the tap is closed.

The secondary valve may include a valve closure movable between a closed position in which it resists flow through said secondary flow passage, and an open position in which it permits flow through the secondary passage.

The secondary valve may further include a valve head operatively coupled to the valve closure and the housing may define a chamber which opens into the downstream portion of the secondary flow passage, and the valve head may be sealingly received in a slidable fashion within a chamber.

The valve closure and the valve head may be rigidly connected to each other such that displacement of one of the head and the closure is transmitted directly to the other of the head and the closure.

The secondary valve may be responsive to the pressure of liquid in the downstream portion of the primary flow passage to move from the open to the closed position.

More specifically the secondary valve may be responsive to the pressure of liquid within said downstream portion in a position that is upstream of and proximate to the primary outlet.

The secondary liquid within the downstream portion of the primary flow passage may apply a force directly to the head of the secondary valve to move it to the closed position.

Further the secondary valve may also be responsive to the pressure of liquid in the secondary flow passage to move from the closed to the open position. Specifically the secondary valve may be responsive to the pressure of liquid in the secondary passage in a position that is immediately upstream of the secondary valve.

The liquid within the secondary passage may apply a force directly to the closure of the secondary valve to move it from the closed to the open position, and this force may be opposed to a force applied by liquid within the primary passage to the head of the secondary valve.

In one form the secondary valve comprises a head integrally formed with the valve closure to form a single article.

In another embodiment the secondary valve may be moved from the closed to the open position by a resilient biasing means urging the secondary valve in a direction opposed to that in which the hydraulic pressure in the downstream portion of the primary flow passage urges the valve. The resilient biasing means may be a spring having one end urging against the housing and an opposed end urging against the secondary valve.

The primary valve control means may include a thermal actuator that undergoes a change in length as a result of a change in temperature and the shuttle valve may include a shuttle valve member operatively connected to the thermal actuator and movable in the flow passage to direct flow between the operating and diverting positions. The shuttle valve may further include a shuttle guide that is operatively coupled to the shuttle valve member to guide smooth movement of the shuttle element between the normal operating and diverting positions in the shuttle chamber.

The device may further include a non return valve mounted in line with the upstream portion of the primary flow passage, and a further non-return valve mounted in line with the secondary flow passage downstream of the secondary valve.

The housing may be broadly rectangular and the primary inlet and primary outlet may be located on opposed faces of the housing. The secondary outlet may be located on a further face of the housing spaced from the primary outlet and the secondary outlet faces outwardly in a direction substantially perpendicular to the primary outlet.

According to another aspect of this invention there is provided a water saving device for use in a hot water system to recover an initial volume of cold water when a hot water tap is turned on, the device comprising:

a housing defining a primary flow passage having a primary inlet at one end and a primary outlet at an opposed end, the housing also defining a secondary flow passage extending from a secondary inlet that opens into and communicates with the primary flow passage intermediate the primary inlet and primary outlet to a secondary outlet, the primary flow passage thereby comprising an upstream portion that is upstream of the secondary inlet of the secondary flow passage and a downstream portion that is downstream of the secondary inlet of the secondary flow passage;

a shuttle valve in said primary flow passage movable in a reversible fashion between a normal operating position in which it permits flow through the primary flow passage from the inlet to the primary outlet and a diverting position in which the valve closes off the primary flow passage downstream of the secondary flow passage and directs liquid into the secondary flow passage, the valve including a thermal actuator for moving the valve from the diverted position to the normal operating position when the temperature of water within the valve reaches or exceeds a set temperature and moving the valve back again when the temperature drops below the set temperature;

a secondary valve for closing off the secondary flow passage, at least when the flow of liquid through the primary outlet out of the housing is stopped, and opening the secondary flow passage when flow out of the primary outlet and the housing is recommenced, the secondary valve including a valve closure movable between a closed position in which it resists flow through said secondary flow passage and an open position in which it permits flow through the secondary passage, and the secondary valve also including a valve head operatively coupled to the valve closure the valve head being received in a slidable fashion within a chamber formed by the housing which opens into the downstream portion of the primary flow passage, wherein the secondary valve is responsive to the pressure of liquid in the downstream portion of the primary flow passage to move from the open to the closed position;

whereby when water flows through the device and the temperature is below the set temperature the primary valve means is in the diverting position and directs water into the secondary flow passage and the secondary valve means is open to permit liquid to flow out of the secondary outlet, and when the temperature exceeds the set temperature the primary valve means will move to the normal operating position closing off the secondary flow passage and directing liquid down the full length of the primary flow passage and out through the primary outlet, and further when the flow of water out of the primary outlet of the housing has ceased the secondary valve means is in the closed position shutting off flow through the secondary conduit.

The valve closure and the valve head may be rigidly connected to each other and form a single unit such that displacement of one of the head and closure is transmitted directly to the other of the head and closure.

The water in the downstream portion of the primary flow passage may apply a force directly to the head of the secondary valve to move it to the closed position. The secondary valve may be responsive to the pressure of water upstream of and proximate to the primary outlet in said downstream portion to move to said closed position.

The secondary valve may also be responsive to the pressure of liquid in the secondary flow passage to move from the closed to the open position. Specifically the secondary valve may be responsive to the pressure of liquid in the secondary flow passage immediately upstream of the secondary valve. The liquid within the secondary flow passage may apply a force directly to the closure of the secondary valve to move it from the closed to the open position.

The shuttle valve may include a thermal actuator that undergoes a change in length as a result of a change in temperature to move between the normal operating position and the diverting position. The thermal actuator may be a wax element. However other forms of thermal actuators that produce movement in response to change in temperature could equally be used.

By appropriate calibration of the thermal actuator the shuttle valve can be set so that it is completely and fully positioned in the normal operating position once the liquid passing through the shuttle valve has reached its set temperature. The set temperature will be the temperature of hot water suitable for use in a shower or bath and might be in the range of 35 to 45° C.

According to yet another aspect of this invention there is provided an apparatus for use in a hot water system to recover an initial volume of cold water when a hot water tap is turned on, the apparatus comprising:

a water conduit;

a device as defined in any one of the first and second aspects of the invention described above coupled in line with the water conduit with the conduit entering at the primary inlet and exiting at the primary outlet; and means for opening and shutting off the water conduit located downstream of the primary outlet.

The device may include any one or more of the optional or preferred features of the invention described above in the preceding aspects of the invention.

The means for opening and shutting off the water conduit may be a tap, eg a domestic tap of the type found in a house.

The apparatus may further include a recycle conduit coupled to the secondary outlet. The apparatus may also include a recycle tank coupled to the recycle conduit. The recycle conduit may be coupled to a cold water conduit, and the pressure of water in the cold water conduit may be reduced relative to that in the recycle conduit so that water in the recycle conduit can enter the cold water conduit.

The invention also extends to a method of conserving water using the device defined in the first aspect of the invention described above, the method comprising using the device to divert an initial volume of water away from a tap and then recovering this water for further use.

The method may include diverting an initial volume of water that is not hot away from a hot water tap and returning it to a water supply or feeding it into a cold water supply.

BRIEF DESCRIPTION OF THE DRAWING(S)

A liquid conservation device that is a water saving device in accordance with this invention may manifest itself in a variety of forms. It will be convenient to hereinafter describe in detail several preferred embodiments of the invention with reference to the accompanying drawings. The purpose of providing this specific description is to instruct persons having an interest in the subject matter of the invention, how to carry the invention into practical effect. In the drawings.

DESCRIPTION OF THE PREFERRED EMBODIMENT(S)

Figure 1:
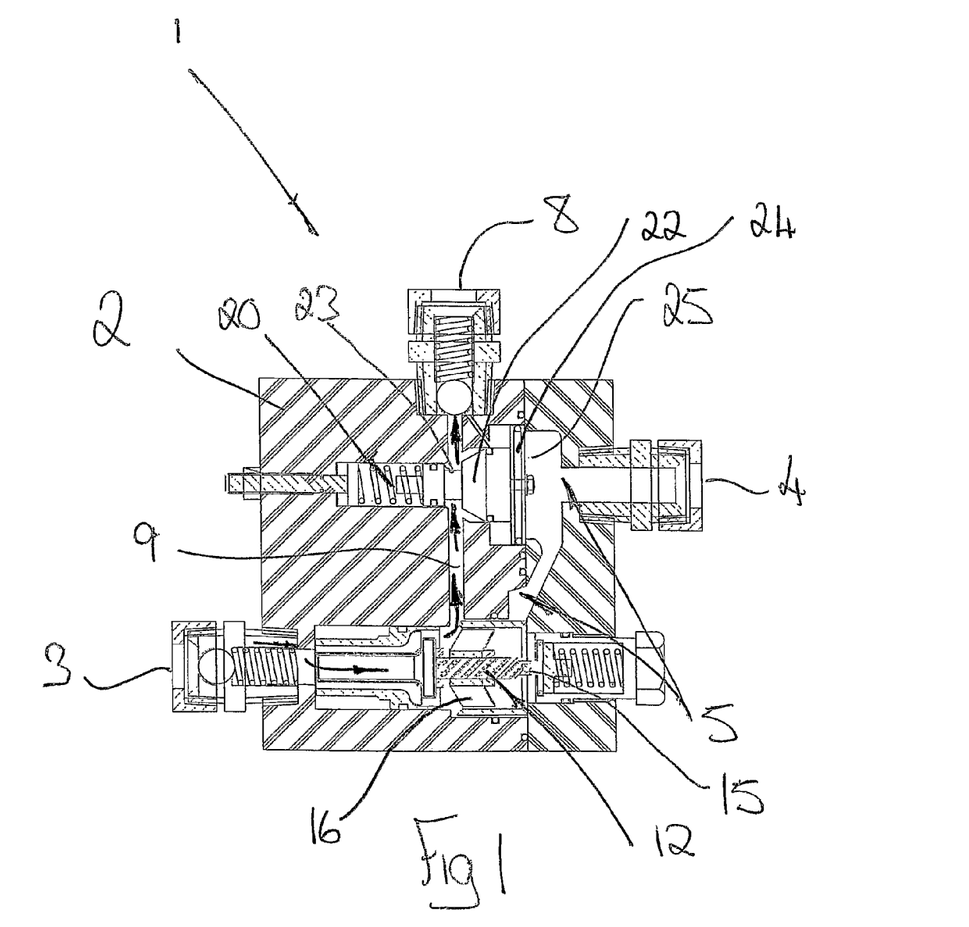
FIG. 1 is a schematic cross-sectional view of the device in accordance with a first embodiment of the invention with the shuttle valve in a diverting position directing water into the secondary flow passage and the secondary valve in an open position.

In FIG. 1 reference numeral 1 refers to a liquid conservation device in accordance with the invention that is used for recycling water from the hot water conduit of a domestic hot water system.

The device 1 comprises broadly a housing 2 defining an inlet 3 and a primary outlet 4 with a primary flow passage 5 extending from said inlet 3 to said primary outlet 4. The housing 2 also defines a secondary flow passage 9 that extends from the primary flow passage 5 to the secondary outlet 8, and a secondary outlet 8 at the end of the secondary flow passage 9. In the illustrated embodiment the secondary flow passage extends from a secondary inlet at point 10 on the primary flow passage 5 positioned some distance from each of its ends. The secondary flow passage 9 opens into and is in fluid communication with the primary flow passage 5 at the point 10 where they meet. Broadly therefore, the primary flow passage 5 may be divided into an upstream portion 11 that is positioned upstream of the point 10 where it joins the secondary flow passage 9 and a downstream portion 13 that is positioned downstream of the point 10 where it joins the secondary flow passage 9.

The device 1 also includes a valve means in the form of a shuttle valve assembly 12 received within the primary flow passage 5 that is positioned proximate to the point 10 where the secondary flow passage 9 intersects the primary flow passage 5. This enables it to perform its primary function of being able to selectively direct water passing through the upstream portion of the primary flow passage 5 into either the secondary flow passage 9 or the downstream portion 13 of the primary flow passage 5.

The cross sectional area of the flow passage 5 is modified to define a shuttle valve chamber where the shuttle valve assembly 12 is located. The shuttle valve assembly 12 includes a shuttle valve member 16 that is longitudinally moveable in the shuttle valve chamber between a diverting position shown in FIG. 1 where it closes off the downstream portion 13 of the flow passage 5 and opens the secondary flow passage 9 and a normal operating position shown in FIG. 2. In the normal operating position it shuts off the secondary flow passage 9 and opens the downstream portion 13 of the primary flow passage 5.

The shuttle valve 12 also includes temperature sensitive control means in the form of a thermostat element or thermal actuator 15 that undergoes a change in length as a result of a change in the temperature of the liquid passing there through. In the illustrated embodiment the thermostat element is a wax element which has been found to be very suitable for this purpose. However, it is to be clearly understood that many other thermostat elements could be equally used. The thermostat element 15 is coupled directly to the shuttle valve member 16 such that expansion and contraction of the element 15 directly moves the valve member 16.

The shuttle valve member 16 is mounted circumferentially over and around the thermal actuator as shown in FIG. 1 and is sized to close off at least one but not both of the downstream portion 13 of the primary flow passage 5 and the secondary flow passage 9 at any one time.

The valve 12 also includes a shuttle valve guide 14 for guiding the shuttle valve 12 back and forth between its two positions in the shuttle valve chamber. The guide 14 is operatively coupled end to end to the thermal actuator 15 and thereby the valve member 16 and the three components move as a single unit. The guide 14 is sized and configured to be snugly received within the shuttle valve chamber and to be able to slide relative to the shuttle chamber. This way the interaction and complementarity of the guide 14 and the chamber helps to effect smooth and consistent to and fro movement of the shuttle valve 12.

The device 1 also includes a means for closing off the secondary flow passage 9 in the form of a secondary shut off valve or poppet valve 20 movable between open and closed positions. In the FIG. 1 embodiment this secondary valve 20 extends transversely to the secondary flow passage 9 and is moveable in a direction transverse to the secondary flow passage 9.

The valve 20 comprises a valve stem 21, a valve closure or valve member 22 mounted on the stem 21, and a valve head or piston 24 also mounted on the stem 21. The closure 22 is sized and configured to complement a valve seat 23 defined in the secondary flow passage 9 when it is in the closed position and engage the seat 23 to resist flow through the secondary flow passage 9. In the open position the valve closure 22 is displaced out of the flow passage 9 permitting water to flow through it.

The valve 20 includes a resilient biasing means in the form of a spring 26 and is biased towards the open position by a spring 26. Thus in the absence of any dominating pressure in the other direction it will be positioned in the open position. However when a dominating pressure is applied in the other direction, the valve 20 is moved to the closed position.

A wall portion of the primary flow passage 5 adjacent to and upstream of the primary outlet form a chamber that is sized and configured to receive the piston 24 therein such that a face of the piston is exposed to liquid in the primary flow passage. The piston 24 effectively completes and forms part of the wall of the flow passage and thereby has the pressure of liquid in the primary flow passages bearing on its face tending to push it back. Obviously the strength of this force would vary depending on the pressure of the water at that time at that point in the primary flow passage. The piston 24 does not close off the flow passage 5.

The piston 24 is operatively and directly coupled to the valve closure 22 so that displacement of the piston by pressure in the primary flow passage 5 causes the valve member 22 to move from the open position into which it is resiliently biased to the closed position. In the drawings the piston 24 is directly mounted on the valve member 22. The valve 20 is moved to the closed position in response to hydraulic pressure in the downstream portion of the primary flow passage as described above.

The housing 2 in the drawings is in the form of a rectangular block. The primary inlet 3 and primary outlet 4 are on opposed sides of the housing 2. The secondary passage 9 extends broadly orthogonal to the direction of the primary flow passage 5 and the secondary outlet 8 faces out perpendicularly to the primary outlet 4. The housing 2 is typically machined from a metallic material such as steel. However, other metallic materials particularly light weight materials may also be used.

Further, the device 1 has non-return valves 30 coupled in line at both the inlet 3 and the secondary outlet 8. The non-return valves 30 resist the flow of water in a reverse direction through the device 1. Each non-return valve 30 comprises a valve closure that moves off its seat in the direction of flow of water but cannot move off the seat in the other direction. This permits water flow there through in a forward direction but not a reverse direction. As the structure and function of non-return valves would be well known in the art and does not form part of this invention it will not be described in further detail in the specification.

Yet further seals, eg in the form of sealing O rings 35, will be provided on the various components as illustrated in the drawings to achieve efficacious sealing of components to ensure the device works effectively.

In use the device 1 is coupled up to a hot water conduit carrying hot water from a water heater to a tap. The tap will be positioned downstream of the primary outlet 4, typically close to the primary outlet 4.

Typically, the first step in any operation of the hot water tap will be to switch the tap on. This situation is shown in FIG. 1.

The act of switching the tap on releases water pressure behind the tap in the downstream portion 13 of the primary flow passage 5. This causes the spring force in the secondary valve 20 to overcome the pressure on the exposed face of the piston 24 and move the valve closure 22 to the open position.

At this time if there has been a long interval between uses of the tap and the temperature of water in the housing has cooled down to ambient temperature the shuttle valve 12 will be in the diverting position as shown in FIG. 1.

In this situation water from a pressurized water supply will pass through the inlet 3 and into the upstream portion 11 of the primary flow passage 5 and then flow into the secondary flow passage 9, through the open valve 20, and out through the secondary outlet 8. This water which is cold is thus passed through the secondary outlet 8 for recycling and does not pass through the tap.

Figure 2:
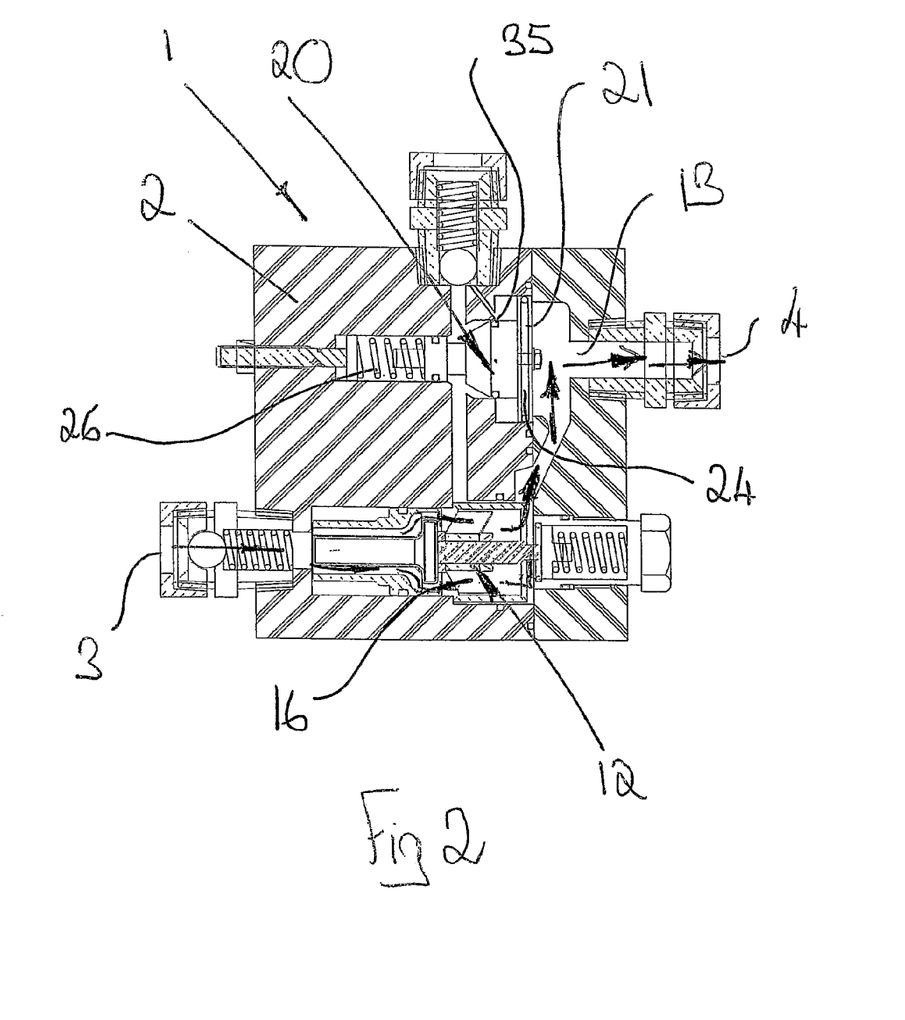
FIG. 2 shows the device of FIG. 1 with the shuttle valve in a normal operating position directing water through the downstream portion of the primary flow passage and shutting off flow through the secondary flow passage and the secondary valve in the open position.

When warm water enters the housing 2 the temperature actuator 15 on the shuttle valve 12 will move the valve member 16 to the normal operating position as shown in FIG. 2. This closes off the secondary flow passage 9 and opens the downstream portion 13 of the primary flow passage 5. This causes warm water to flow out of the hot water tap. This mode or position continues until usage of the hot water is completed and the tap is switched off.

Figure 3:
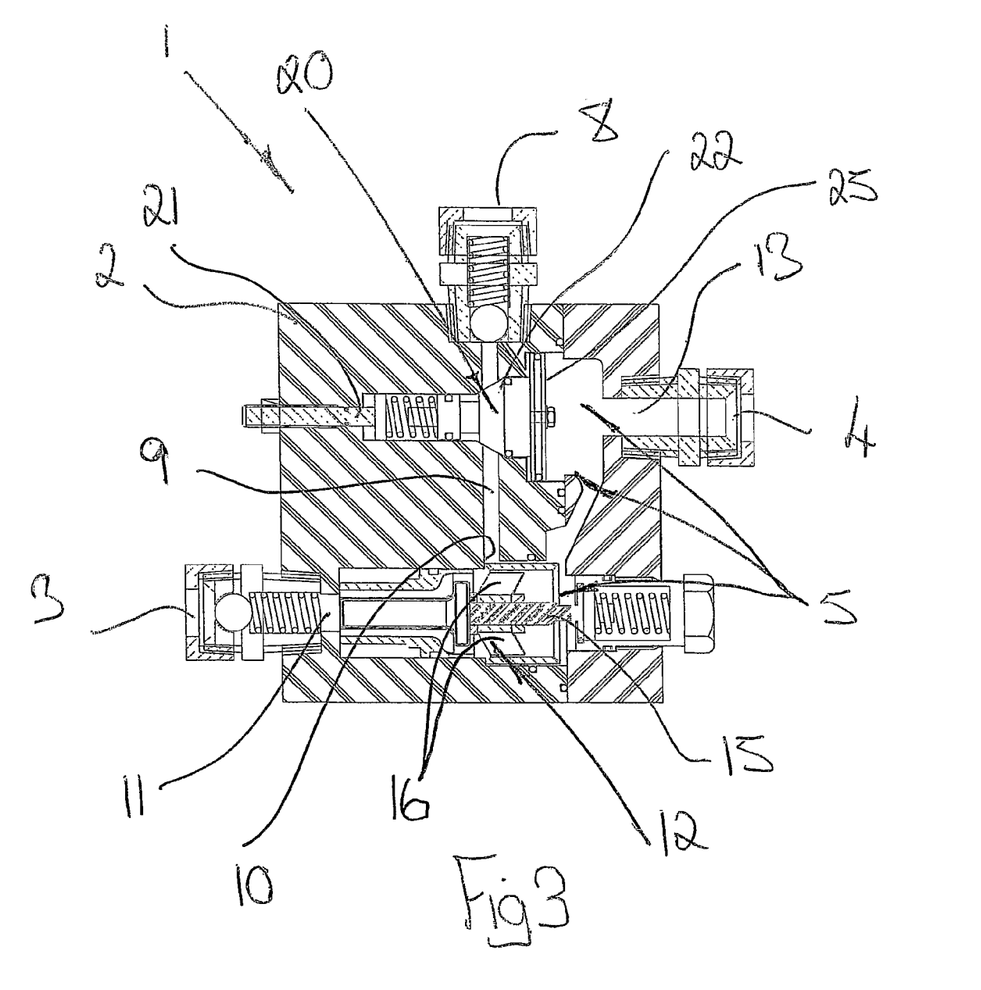
FIG. 3 shows the device of FIG. 1 with the shuttle valve in the normal operating position and the secondary valve moved to the closed position due to a tap adjacent to the device being switched off.

When the hot water tap is switched off the pressure in the portion 13 of the primary flow passage 5 behind the tap is increased and this causes the piston 24 to displace the valve closure 22 to the closed position. This position is shown in FIG. 3. The movement of the poppet valve 20 to the closed position shuts off the secondary flow passage 9 and resists the flow of water out through the secondary outlet 8 while the tap is switched off.

Figure 4:
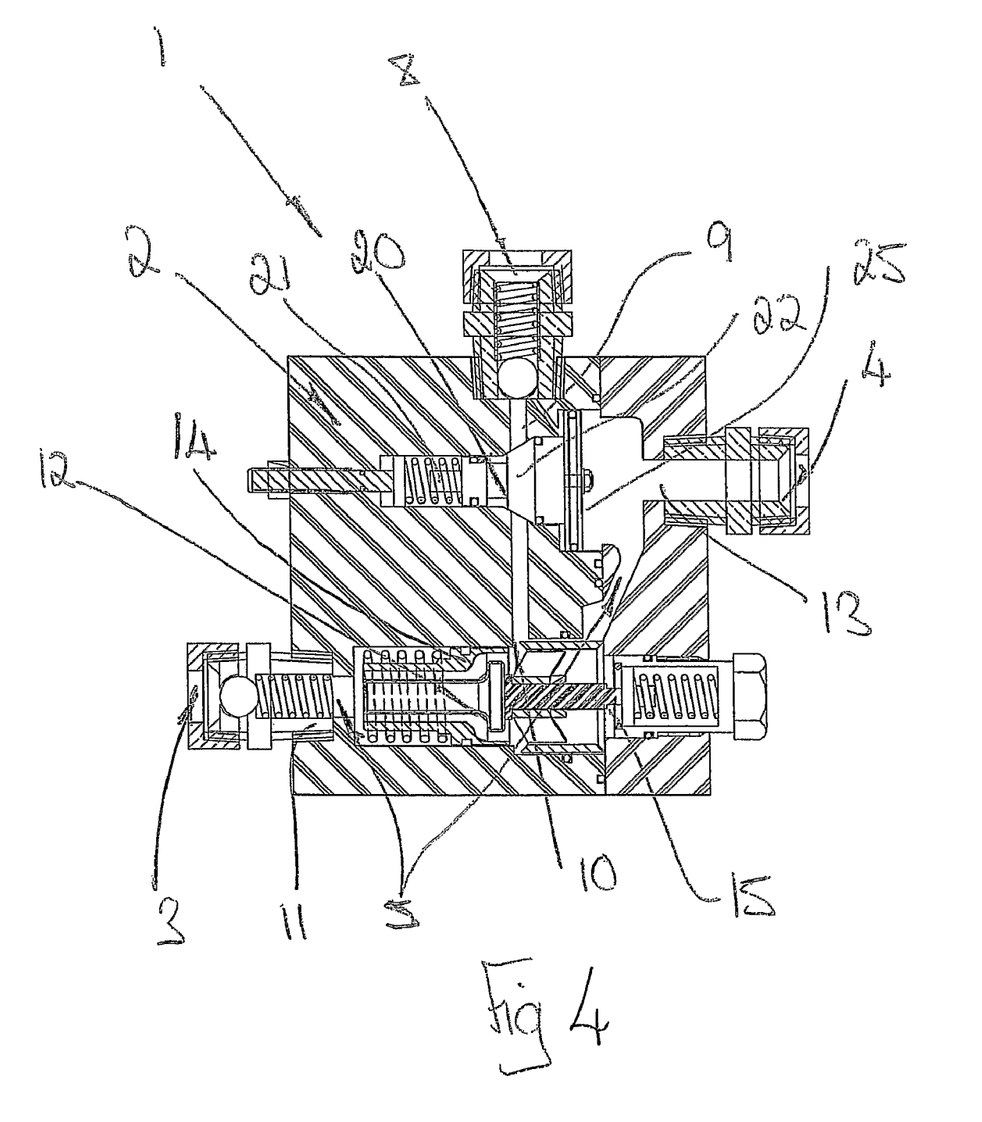
FIG. 4 shows the device of FIG. 1 after some period of non use with the shuttle valve having moved back to the diverting position and the secondary valve still in the closed position.

Immediately after the tap is switched off the shuttle valve member 16 will be in the normal operating position as shown in FIG. 3. However, if the tap remains switched off for a length of time the water in the housing 2 cools down to ambient temperature and this will cause the shuttle valve member 16 to move progressively back to the diverting position where it opens the secondary passage 9. This is shown in FIG. 4. This allows water to flow into the secondary flow passage 8 and along it to the valve 20. However, the position of the valve 20 in the closed position prevents water from continuing to flow from the supply through the secondary passage 9 and out through the secondary outlet 8. The various components will remain in this position until the device is next used. Thereafter the cycle can repeat itself.

The above description explains the situation where there is a long interval between consecutive uses of the tap and the water in the housing cools fully back to ambient temperature between these uses.

If the tap is reused shortly after being used to produce hot water then the water in the housing 2 will not yet have cooled back to ambient temperature. The shuttle valve member 16 will not have moved out of the normal operating position and thus, water will flow directly through the downstream portion 13 of the flow passage 5. It will not be initially diverted through the secondary flow passage 9. Thus, the device 1 has the ability only to divert the water when it is below the desired temperature.

Figure 5:
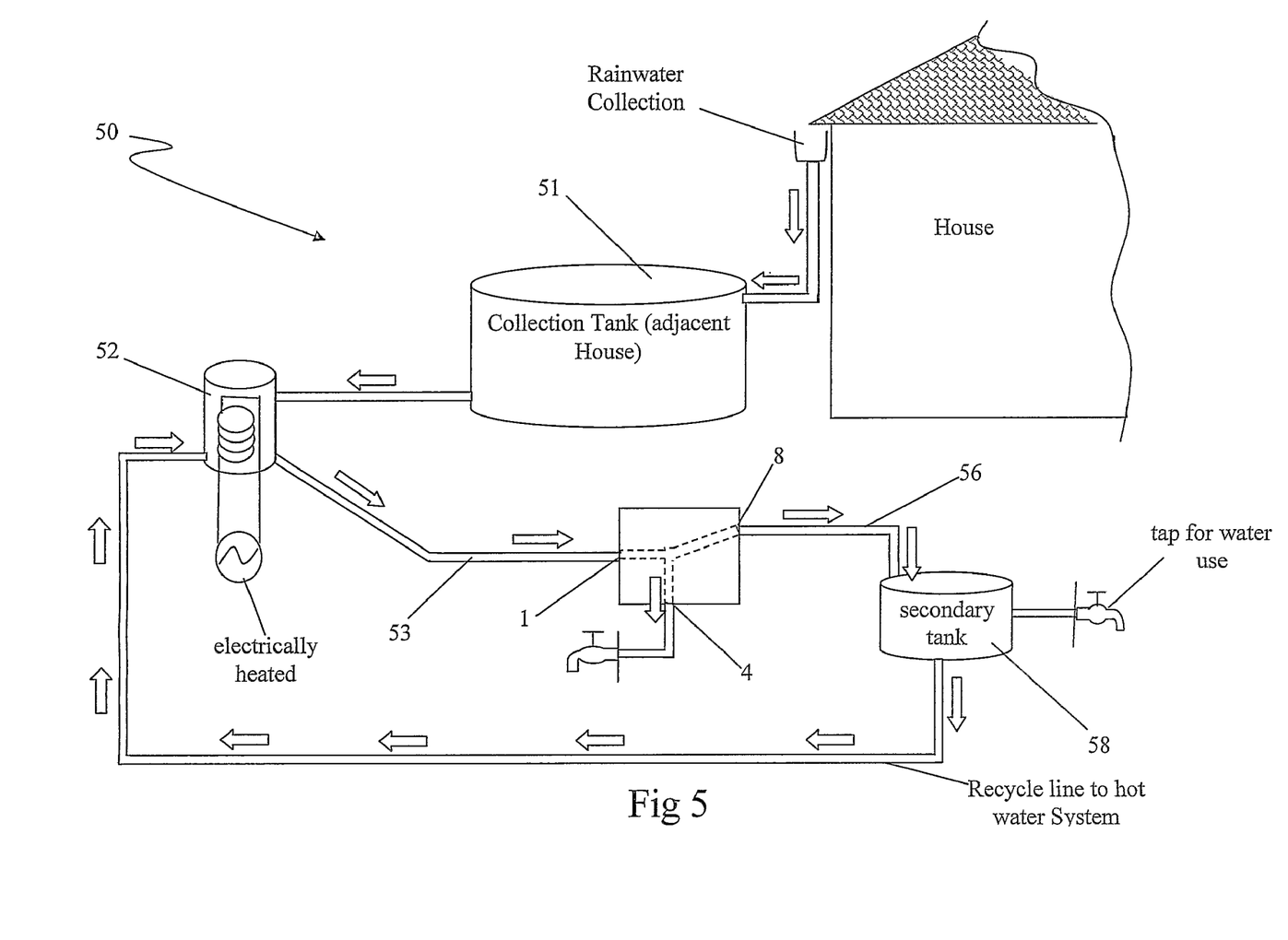
FIG. 5 is a schematic flow sheet showing how the device might be used in a domestic hot water supply apparatus.

FIG. 5 shows a typical domestic hot water apparatus to which the device of FIG. 1 is applied. The apparatus is referred to generally by the reference numeral 50.

A water supply contains water for use at a usable supply pressure, e.g. 280-700 kPa (40-100 p.s.i). In the illustrated embodiment the supply is provided by a tank 51 collecting rain water and the like. The supply could equally be provided by a domestic mains supply of municipal water.

Water can be drawn from the supply 50 and fed into a water heater 52. This comprises a tank of water which is heated, eg by electricity or gas, to a predetermined temperature of about 35-45° C. The tank typically will have a capacity of several hundred litres.

This water is then drawn off the hot water system by means of hot water supply lines 53. The lines 53 branch at various points and terminate in hot water taps 54 for use in various points in the house. One point is indicated by the reference numeral 54.

A device 1 is mounted in line with a said supply line 53 adjacent the tap 54. The device 1 is positioned just upstream of the tap with the inlet 3 coupled to the upstream portion of the pipe and the primary outlet 4 coupled to the downstream portion of the pipe. The secondary outlet 8 of the device 1 is coupled to a recycle line 56 which enters a recycling tank 58. Thus, water entering the device 1 either issues from the tap 104 or ends up in the recycling tank 58. The water entering the secondary tank 58 can either be drawn from the tank for use or recycled to the water supply 51.

Specifically the water in the recycling tank 58 could be recycled back into the hot water heater. It could also be directed into the cold water conduit where it is mixed with the cold water. This may be accomplished by reducing the pressure in the cold water line to that below the pressure of the recycle water to allow it to enter the cold water conduit and mix with the cold water.

In use when the primary outlet 4 or hot water tap 54 is opened the pressure in the downstream portion 13 of the flow passage 5 behind the tap 54 dissipates as the water runs out of the tap. The drop in pressure in the downstream portion 13 causes the secondary valve 20 to move to the open position under the influence of the spring biasing means.

If the water entering the device 1 is cold the shuttle valve 12 will be in the diverting position and water will be directed through the secondary flow passage 9 and out of the secondary outlet 8. This will continue to occur until the water entering the primary flow passage 5 from the water supply warms up to the desired temperature, eg 35-45° C.

As the water warms up, it progressively causes the thermostat element 15 to expand and lengthen, causing the shuttle valve member 16 to move from the diverting position towards the normal operating position. Once the predetermined design temperature of, eg 35-45° C., has been reached the shuttle valve member will have moved fully into the normal operating position and all water flowing through the valve 12 will flow through the downstream portion 13 of the primary flow passage 5.

This water will then issue from the hot water tap 54 as hot water and be used in the normal fashion by a user. Substantially all of the water that issues from the primary outlet 4 will be hot water at or about the set temperature and suitable for use. It is not preceded by a period of cold water. Instead the initial volume of cold water is diverted through the passage 9 and out through the outlet 8.

After the user has completed their use of the hot water they switch off the tap closing the primary outlet 4. This immediately pressurises the downstream portion 13 of the flow passage 5 behind the primary outlet 4 moving the secondary or poppet valve 20 back to the closed position.

FIGS. 6 to 10 illustrate a liquid conservation device for use in a domestic hot water system in accordance with a second embodiment of the invention. The device is indicated generally by reference numeral 100.

Figures 6, 7:
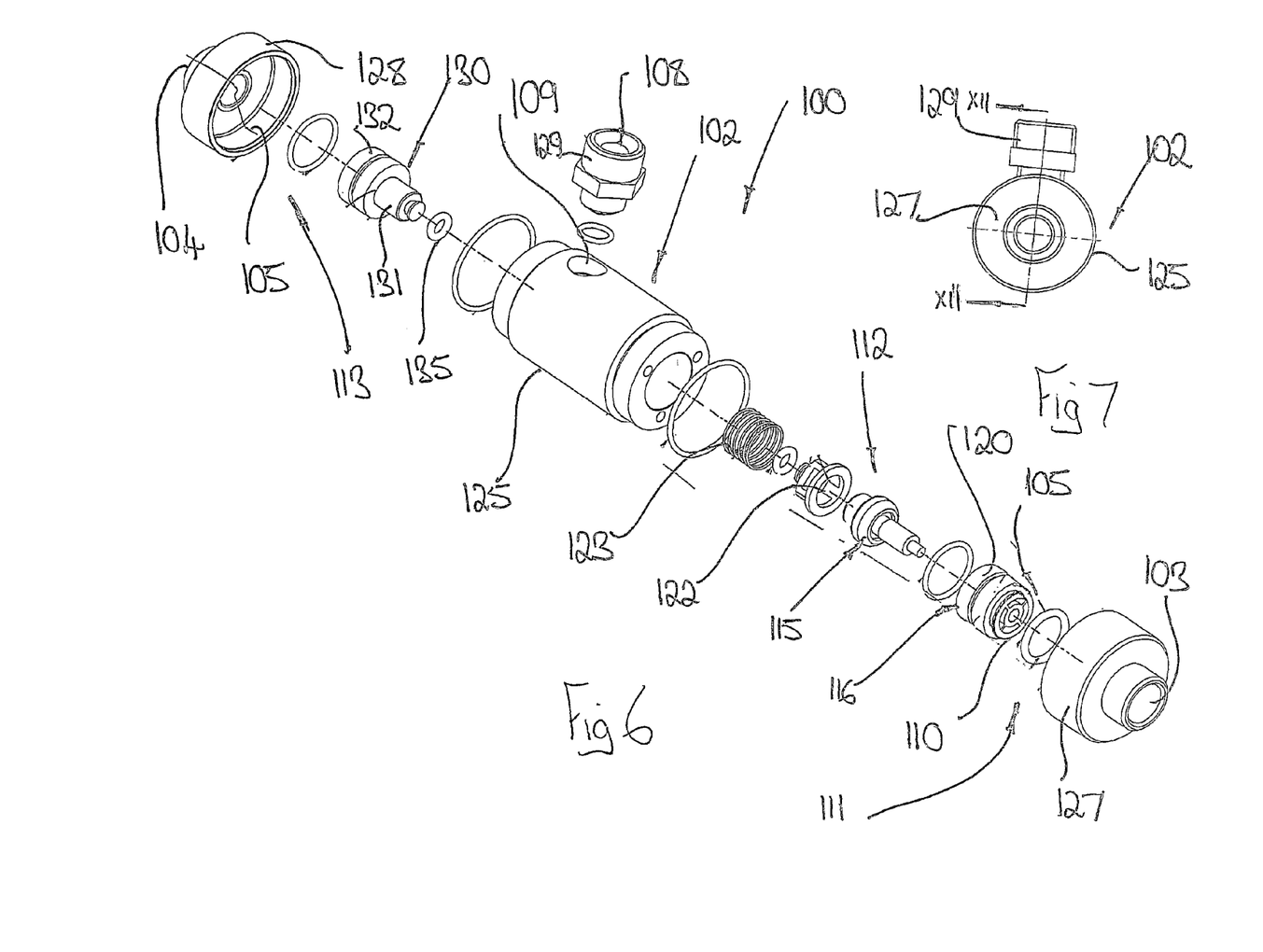
FIG. 6 is an exploded three dimensional view of a device in accordance with a second embodiment of the invention.
FIG. 7 is an end view of the device of FIG. 6.
Figure 8:
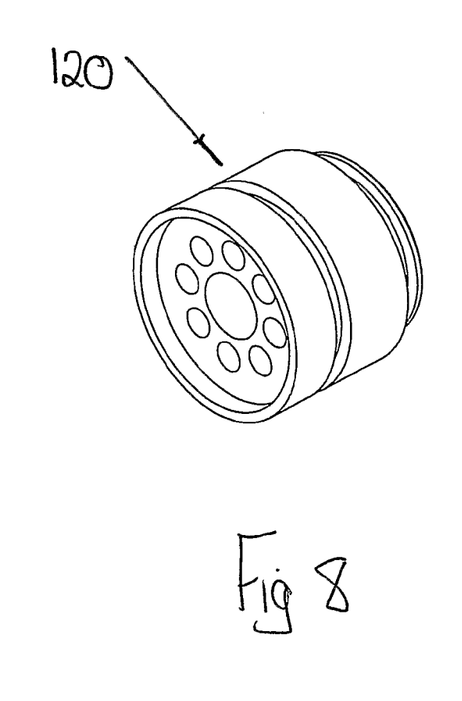
FIG. 8 is a three dimensional view of one of the components of the shuttle valve assembly of the device of FIG. 6.
Figure 9:
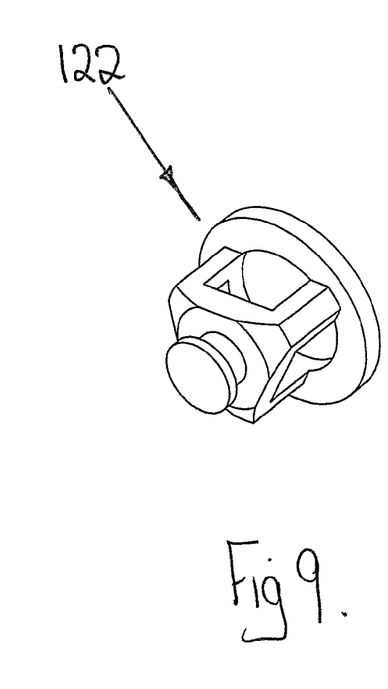
FIG. 9 is a three dimensional view of another one of the components of the shuttle valve assembly of the device of FIG. 6.
Figure 10:
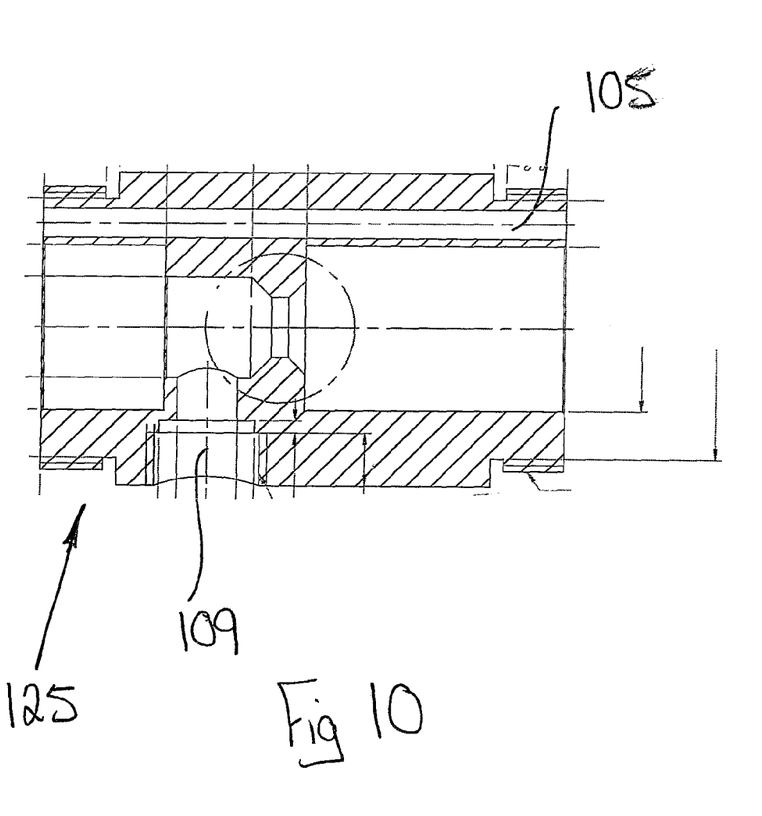
FIG. 10 is a sectional view of one component making up the housing of the device of FIG. 6, section through X-X, the component rotated through 180 degrees about its longitudinal axis when compared with its orientation shown in FIG. 6.

This device 100 has some similarities to the first embodiment and thus a similar system of reference numerals has been used to refer to the different components.

The device 100 comprises broadly a housing 102 defining a primary inlet 103 and a primary outlet 104. A primary flow passage 105 extends from the inlet 103 to the outlet 104.

The housing 102 also defines a secondary passage 109 that extends from a secondary inlet at intermediate point 110 on the primary flow passage 105 to a secondary outlet 108. The secondary passage 109 opens into and communicates with the primary passage 105 at said intermediate point 110. The portion of the primary flow passage 105 upstream of the intermediate point is called the upstream portion 111 and the portion of the primary flow passage downstream of the intermediate point is the downstream portion 113.

Both the primary and secondary flow passages 105 and 109 follow tortuous paths through the housing 102 and thus directional arrows are used in the drawings to show these passages.

The device 100 also includes valve means in the form of a shuttle valve assembly 112 to selectively direct flow into the downstream portion 113 of the primary flow passage 105 and the secondary flow passage 109 depending on the temperature of the water in the housing 102.

The shuttle valve assembly 112 has a valve member 116 that moves to and fro in the housing 102 between a normal operating position in which it permits water to flow to the downstream portion 113 of the primary flow passage 105 and a diverting position in which it directs water into the secondary flow passage 109.

In the normal operating position a leading end of the valve member 116 is spaced away from a seat 118 on the housing 102 permitting water to flow there through. Further in this position a trailing end of the valve member 116 is sealed up against a seat 119 on the housing 102 resisting the flow of water there through. In the diverting position the leading end of the valve member 116 is sealed up against the seat 118 and the trailing end is spaced away from the seat 119.

The shuttle valve assembly 112 further includes a thermal actuator 115 that undergoes a change in length as a result of a change in temperature of the liquid passing there through. The thermal actuator 115 is coupled in line with the valve member 116 such that expansion or contraction of the thermal actuator 115 is translated directly into movement of the valve member 116.

In the illustrated embodiment the valve member 116 comprises component 120 mounted on the leading end of the actuator 115. This component is shown in more detail in FIG. 8. A sealing O ring is mounted thereto as shown in the drawing. It also comprises component 122 mounted on the trailing end of the actuator 115. This component is shown in more detail in FIG. 9. A sealing O ring is mounted to the rear end thereof which is of reduced diameter relative to the rest as shown in the drawings. The components 115, 120 and 122 form a sub assembly which moves together as a single unit within the housing 2.

A resilient spring 123 is positioned in between the component 122 and the housing 102 to slightly bias the shuttle valve member 116 towards the diverting position and ensure that the components are assembled together under compression. However, expansion and contraction of the thermal actuator 115 dominates the spring 123 and is the key driver of movement of the shuttle valve member 116.

The housing 102 is broadly made up of four components. A cylindrical body 125 forms the central section of the body 102. It has end caps 127 and 128 at each end thereof. It also has a branch section 129 mounted on the central section 125 extending transversely away there from. This branch section 129 forms part of the secondary passage 109 and defines the secondary outlet 108.

The device 100 also includes means for closing off the secondary flow passage in the form of a secondary valve 130. The valve 130 comprises a valve member 131 that is movable between a closed position in which it closes off the secondary flow passage 109 and an open position in which it permits the flow of water through the secondary flow passage 109. The valve member 131 has a seal 135 that seals against the seat formed by the inclined surface 136 on the housing 102.

The valve 130 also includes a head 132 that is slideable in a chamber defined in the housing 102. The piston 132 has a circumferential seal, eg an O ring seal, sealing it against the wall of the cylinder. The chamber has a cylindrical surface that complements the head such that the head 132 seals against this surface and also has the feature that it opens into the downstream portion of the flow passage 105 at one end.

The head 132 and chamber are arranged such that the face of the head 132 is exposed to the water in the downstream portion 113 of the primary flow passage 105. Thus, when the pressure in the downstream portion 113 increases above a certain point it causes the head 132 and thereby also the valve member 131 to move to the closed position and close off the secondary flow passage 109. The valve member 131 by contrast opens into the secondary flow passage 109. A surface of the valve member 131 that is parallel to the head 132 is exposed to water within the secondary flow passage 109. This way the pressure of water in the flow passage 109 can apply an opposing force to that in portion 113 of passage 105.

In use the device 100 is used to divert an initial flow of water through a hot water conduit that is below the desired temperature, away from the hot water tap. The water is diverted into a secondary conduit from where it can be reused.

Figure 12:
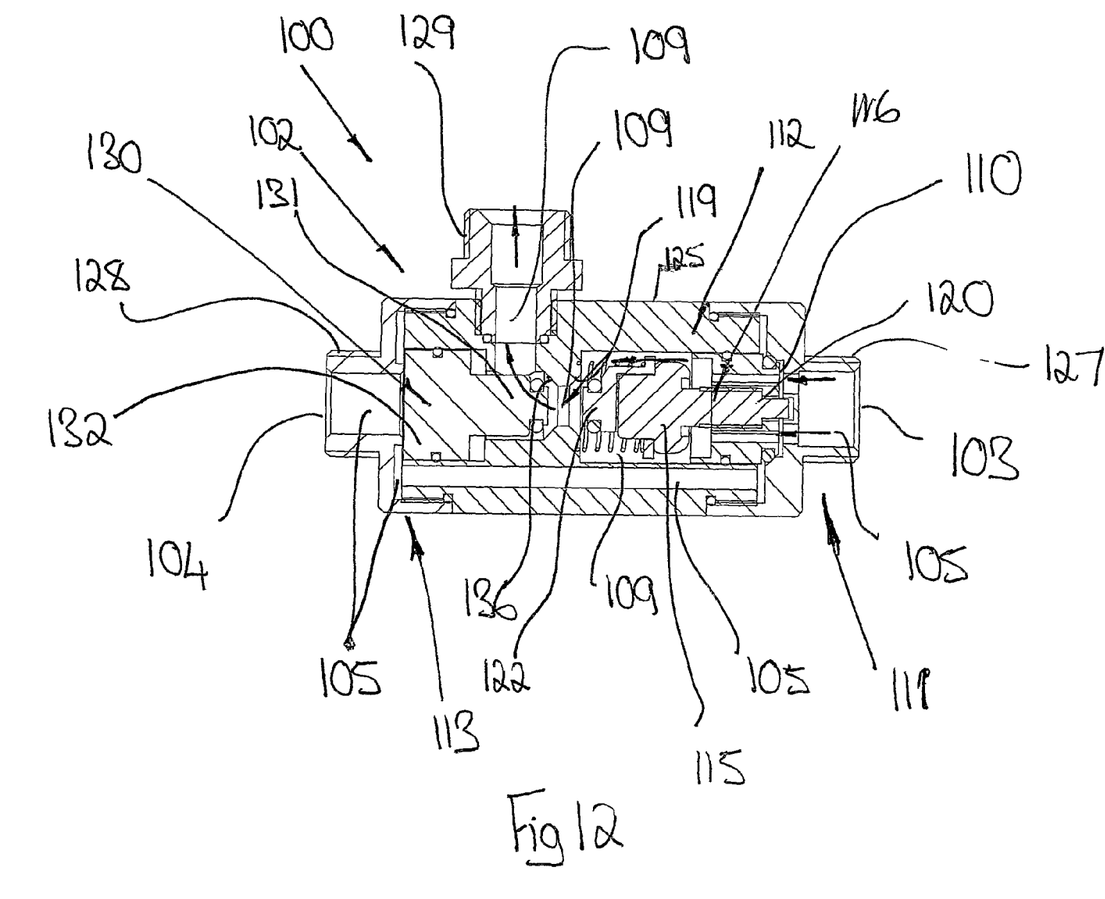
FIG. 12 is a sectional view of the device in FIG. 6, section taken through XII-XII, wherein the shuttle valve is in a diverting position and the secondary valve is in an open position.

FIG. 12 shows the device 100 when the hot tap is initially opened after a long period of non use. The water in the housing 102 is at ambient temperature and as a result the thermal actuator 115 has positioned the shuttle valve member 116 in the diverting position where it closes off the downstream portion 113 of the primary flow passage 105. The valve member 116 permits flow from the upstream portion 112 of the flow passage 105 into the secondary flow passage 109. Further the pressure of water in the secondary flow passage 109 is greater than the pressure of water in the downstream portion 113 of the primary flow passage 105 which has just been emptied by opening the tap. This greater pressure on the right side of the valve member 131 moves the secondary valve member 131 to the open position where it permits water to flow along the full length of the secondary flow passage 109 and out the outlet 108.

Figure 13:
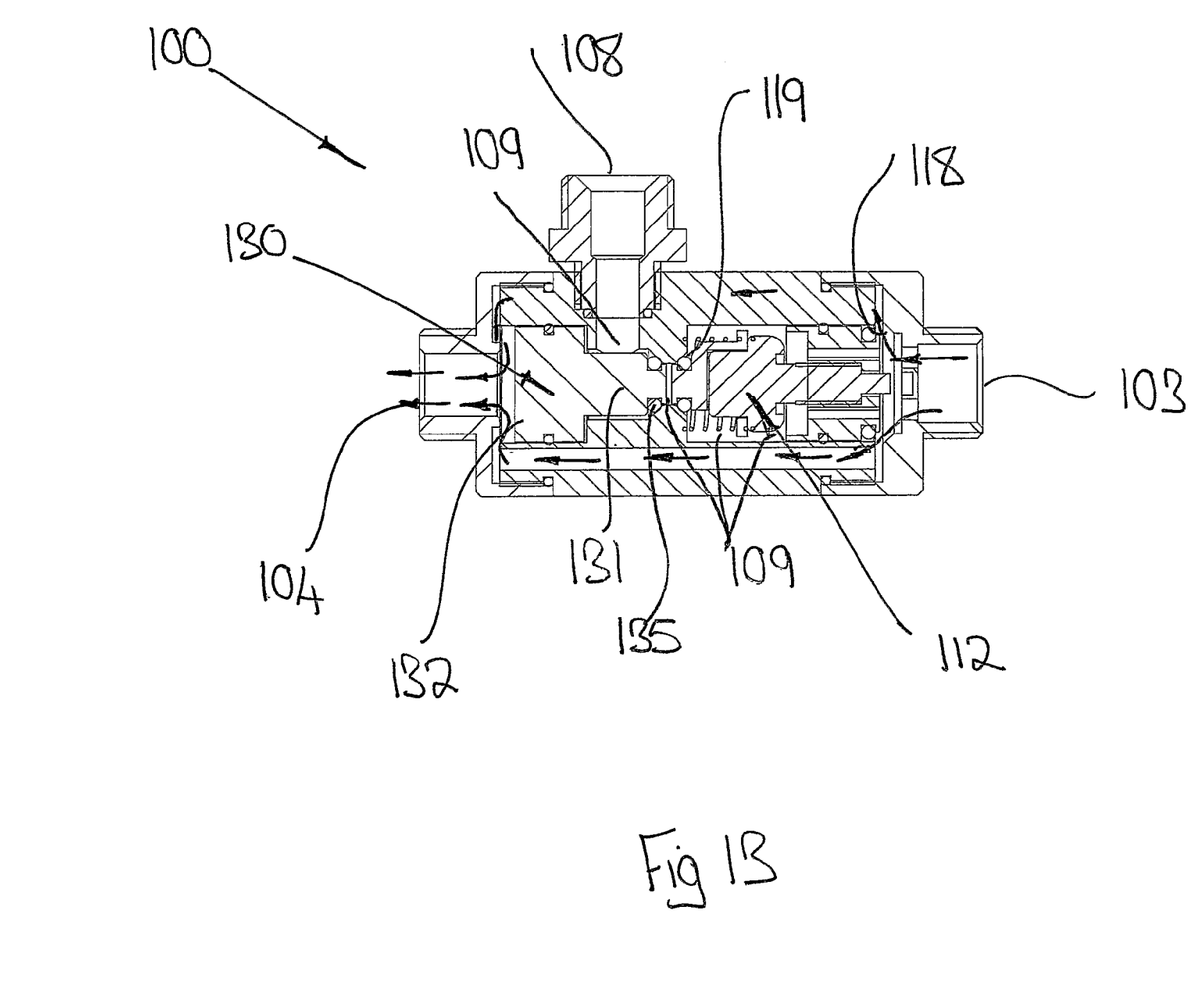
FIG. 13 is a further sectional view of the device in FIG. 12, wherein the shuttle valve is in a normal operating position and the secondary valve is in a closed position.

As the temperature of the water from the hot water heater flowing into the housing 102 increases, the thermal actuator 115 moves the shuttle valve member 116 towards the normal operating position. Over time this directs more and more water into the downstream portion 113 of the primary flow passage 105. When this happens the water in the downstream portion 113 has a greater pressure than the water in the secondary flow passage 109 which is now shut off from the inlet 103. The greater pressure from the left is applied to the head 132 of the valve 130 and moves the valve member 131 to the right into the closed position shutting off flow through passage 109. This is shown in FIG. 13.

It should be recognised that this is a consequence of water flowing through the downstream portion 113 of the flow passage but it is not necessary for this to occur for water to flow along this portion 113.

The device 100 then remains in this configuration while water issues from the hot water tap. Substantially all the water that issues from the hot water tap is warm and can be used by the user. The initial cold volume of water has been directed through the secondary flow passage 109.

When the user switches off the tap, the flow of water through the primary flow passage 105 ceases. At this point the secondary valve 130 stays in the closed position, on the right, as the portion 113 of the passage 105 is still pressurised with water and there is no counter force from the secondary passage 109 on it to move it to the left.

After some time of non use, the water in the housing 102 cools down and, the thermal actuator 115 moves the shuttle valve member 116 to the diverting position again.

This permits water from the inlet 103 and the water supply once more to flow through the valve assembly 112 and into the secondary flow passage 109 upstream of the secondary valve 130. There it bears up against the secondary valve 130 from the right side as shown in the drawings. The secondary valve 130 stays in the closed position because the pressure of the water in the downstream portion stays substantially the same. The water in the portion 113 is still pressurised even though it is cut off from the inlet 103 and water supply. The volume of water is effectively sealed within the downstream portion 113 and this maintains the water pressure necessary to hold it in the closed position.

When the tap is opened for the next use the water in the downstream portion 113 of the primary flow passage 105 immediately drains out of it and the pressure from this portion 113 bearing on the secondary valve 130 is greatly reduced. As a result the pressure of the water in the secondary flow passage 109 upstream of the secondary valve 130 dominates and displaces the secondary valve 130 to the left into the open position. This then permits water to flow through the secondary passage and out the outlet 108 shown in FIG. 12 and completes the cycle.

The FIG. 6 embodiment basically performs the same function as the FIG. 1 embodiment but it does it in a more compact and efficient manner. Further it can be manufactured with off the shelf components which reduces the cost of manufacture when compared with the FIG. 1 embodiment.

The secondary flow passage 109 effectively intersects the primary flow passage at the right side (in the drawings) of the component 120. The secondary passage 109 passes through the openings defined in the component 120 shown in FIG. 8, around the thermal actuator 115, and then through the openings in the component 122 shown in FIG. 9. Thereafter it passes through the narrow throat defined in the central section 125, through the secondary valve 130 and through section 129. FIG. 12 of the drawings shows this flow passage most clearly.

Figure 11:
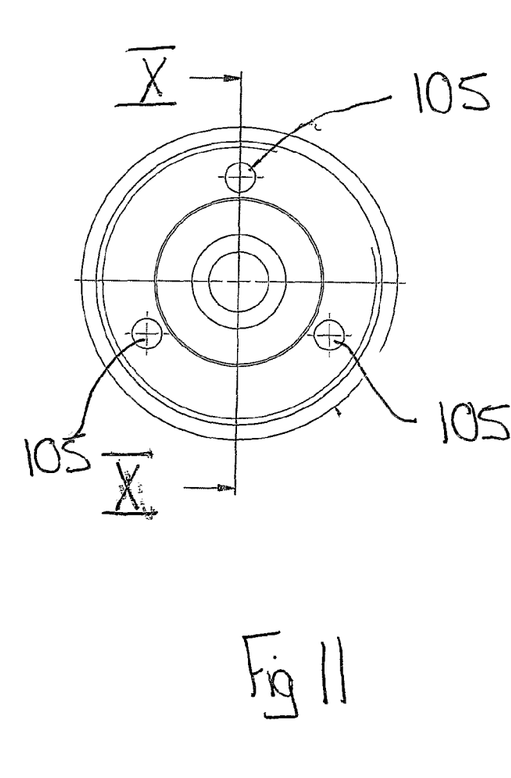
FIG. 11 is an end view of the component shown in FIG. 10.

The primary flow passage 105 passes around the leading edge of the component 120 and then through three angularly spaced passageways defined in the central body 125. These passageways are shown particularly clearly in FIGS. 10 and 11 and FIG. 13. It then passes back through the space between central section 125 and the end cap 128 past the head 132 of the valve 130. It then passes out of the housing through the primary outlet 4. The head 132 of the secondary valve 130 is moved from the open to the closed position by the pressure of the water passing from the section 125 and the end cap 128 back into the central portion of the section 125. It bears against the head 132 of the valve and dominates any pressure applied to the other end of the valve.

One difference between the FIG. 1 and FIG. 6 embodiments is the fact that the secondary valve is moved to the open position by water pressure in the secondary flow passage rather than a biasing means such as a spring. Rather the forces of water in respectively the downstream portion of the primary flow passage and the secondary passage compete with each other for dominance to move the secondary valve between said open and closed positions. Further Applicant believes that the sealing effected by the FIG. 6 embodiment is more efficacious than that for the FIG. 1 embodiment.

An advantage of the device described above with reference to FIG. 1 is that it can be used to save liquid, eg water, that would otherwise be lost by being passed down a drain. This liquid can then be gainfully used in other applications or recycled to a clean liquid supply. This has the potential to substantially reduce the wastage of clean or potable water.

An advantage of the device and apparatus is that it automatically divert the initial volume of water that is not hot to the secondary outlet and only send it out through the tap when it is at the right temperature. It requires absolutely no input from a user. This is important to ensure the fail safe and reliable operation of the device.

Further, the device is relatively simple and will be capable of low maintenance and trouble free operation. Further still, it will be able to be manufactured and supplied to the market at a reasonable cost.

A yet further advantage of the invention is that it can be retrofitted to existing hot water lines in houses without modifying or adjusting the taps. The device is simply coupled in line with the hot water line just upstream from the hot water tap. Conveniently the device might be received in a cupboard or the like or may be mounted on the wall.

A further advantage of the device is that it stops the flow of water through the device and into the diverting line in between uses of the tap. If this did not occur water could flow unchecked through the secondary flow passage into the recycle tank and this would be unacceptable. The device automatically causes the secondary valve to close at least when the hot water tap is closed. An achievement of the Applicant's invention is that it is able to achieve this functionality of the secondary line automatically by using the hydraulic pressure in the device.

It will of course be realised that the above has been given only by way of illustrative example of the invention and that all such modifications and variations thereto as would be apparent to persons skilled in the art are deemed to fall within the broad scope and ambit of the invention as herein set forth.

The invention claimed is:

1. A water conservation device comprising:
a housing defining a primary flow passage between an inlet at one end and a hot water outlet at an opposed end, the housing also defining a secondary flow passage extending from said inlet to a secondary outlet;
a primary valve in said primary flow passage and axially movable between sealably closed engagement with a primary annular seat in said housing to permit flow through the primary flow passage from the inlet to the hot water outlet, and a diverting position in which the primary valve opens to direct flow from said inlet into the secondary flow passage, the primary valve being biased to open the secondary flow passage by a spring acting between the housing and the primary valve;
a control element operable in response to increasing temperature of flow through said inlet to close said valve against the bias of said spring; and
a secondary valve operable by a pressure differential between the secondary outlet and the hot water outlet and serving to close the secondary flow passage in response to closure of flow downstream of the hot water outlet.

2. The water conservation device according to claim 1, wherein the secondary valve further includes a valve head sealingly received in a slidable fashion within an axial bore formed in said housing and having a working face held at a hot water outlet pressure, and a valve closure axially closing said secondary passage by interaction with a secondary annular seat in said housing and adjacent to said primary annular seat.

3. The water conservation device according to claim 2, wherein the primary and secondary annular seats are tapered seats.

4. The water conservation device according to claim 3, wherein the primary valve and valve closure are each provided with O-ring seals to assist sealing against the respective tapered seat.

5. The water conservation device according to claim 1, wherein the control element includes a thermal actuator that undergoes a change in length as a result of a change in temperature.

6. The water conservation device according to claim 1, wherein one or both of then upstream portion of the primary flow passage, and a downstream portion of the secondary flow passage includes an in-line non-return valve.

7. The water conservation device according to claim 1, wherein the secondary outlet faces outwardly in a direction substantially perpendicular to the primary outlet.

8. A water conservation apparatus for use in a hot water system to recover an initial volume of cold water when a hot water tap is turned on, the apparatus comprising:
- a water conduit;
- a device as defined above in claim 1, coupled in line with the water conduit with the conduit entering at the primary inlet and exiting at the hot water outlet; and
- means for opening and shutting off the water conduit located downstream of the hot water outlet.

9. The water conservation apparatus according to claim 8, wherein the means for opening and shutting is a tap.

10. The water conservation apparatus according to claim 9, wherein the tap is a domestic tap of the type found in a house.

11. The water conservation apparatus according to claim 8, further including a recycle conduit coupled to the secondary outlet.

12. The water conservation apparatus according to claim 11, further including a recycle tank coupled to the recycle conduit.

13. The water conservation apparatus according to claim 11, wherein the recycle conduit is coupled to a cold water conduit, and a pressure of water in the cold water conduit is reduced relative to that in the recycle conduit in a manner that water in the recycle conduit can enter the cold water conduit.

14. A water saving device for use in a hot water system to recover an initial volume of cold water when a hot water tap is turned on, the device comprising:
- a housing defining a primary flow passage having a primary inlet at one end and a primary outlet at an opposed end, the housing also defining a secondary flow passage extending from a secondary inlet that opens into and communicates with the primary flow passage intermediate the primary inlet and primary outlet to a secondary outlet, the primary flow passage thereby comprising an upstream portion that is upstream of the secondary inlet of the secondary flow passage and a downstream portion that is downstream of the secondary inlet of the secondary flow passage;
- a shuttle valve in said primary flow passage movable in a reversible fashion between a normal operating position in which it permits flow through the primary flow passage from the inlet to the primary outlet and a diverting position in which the valve closes off the primary flow passage downstream of the secondary flow passage and directs water into the secondary flow passage, the valve including a thermal actuator for moving the valve from the diverted position to the normal operating position when a temperature of water within the valve reaches or exceeds a set temperature and moving the valve back again when the temperature drops below the set temperature;
- a secondary valve for closing off the secondary flow passage, at least when the flow of water through the primary outlet of the housing is stopped, and opening the secondary flow passage when flow out of the primary outlet and the housing is recommenced, the secondary valve including a valve closure movable between a closed position in which it resists flow through said secondary flow passage and an open position in which it permits flow through the secondary passage, and the secondary valve also including a valve head operatively coupled to the valve closure the valve head being received in a slidable fashion within a chamber formed by the housing which opens into the downstream portion of the primary flow passage, wherein the secondary valve is responsive to the pressure of water in the downstream portion of the primary flow passage to move from the open to the closed position;
- whereby when water flows through the device and the temperature is below the set temperature the shuttle valve is in the diverting position and directs water into the secondary flow passage and the secondary valve is open to permit water to flow out of the secondary outlet, and when the temperature exceeds the set temperature the shuttle valve moves to the normal operating position closing off the secondary flow passage and directing water down the full length of the primary flow passage and out through the primary outlet, and further when the flow of water out of the primary outlet of the housing has ceased the secondary valve is in the closed position shutting off flow through the secondary conduit.

15. The water saving device according to claim 14, wherein the secondary valve closure and the secondary valve head are rigidly connected to each other and form a single unit in a manner that displacement of one of the head and closure is transmitted directly to the other of the head and closure.

16. The water saving device according to claim 14, wherein the water in the downstream portion of the primary flow passage applies a force directly to the head of the secondary valve to move it to the closed position.

17. The water saving device according to claim 16, wherein the secondary valve is responsive to the pressure of water upstream of and proximate to the primary outlet in said downstream portion to move to said closed position.

18. The water saving device according to claim 14, wherein said secondary valve is responsive to the pressure of water in the secondary flow passage to move from the closed to the open position.

19. The water saving device according to claim 18, wherein the secondary valve is responsive to the pressure of water in the secondary flow passage immediately upstream of the secondary valve.

20. The water saving device according to claim 18, wherein the water within the secondary flow passage applies a force directly to the closure of the secondary valve to move it from the closed to the open position.

21. The water saving device according to claim 20, wherein the shuttle valve includes a thermal actuator that undergoes a change in length as a result of a change in temperature to move between the normal operating position and the diverting position.

* * * * *